(No Model.)
M. SEXTON.
PIPE JOINT.
No. 546,906. Patented Sept. 24, 1895.
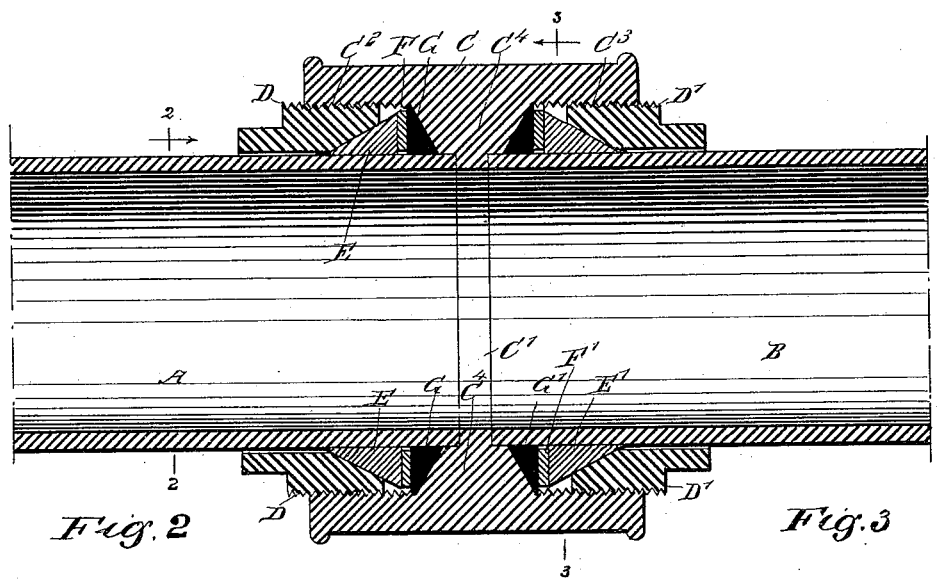
Fig. 1
Fig. 2  Fig. 3
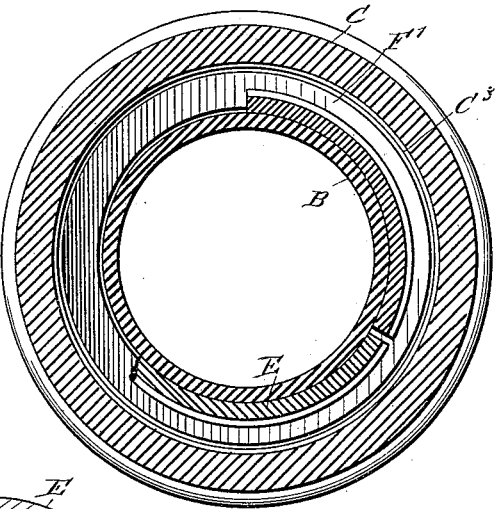
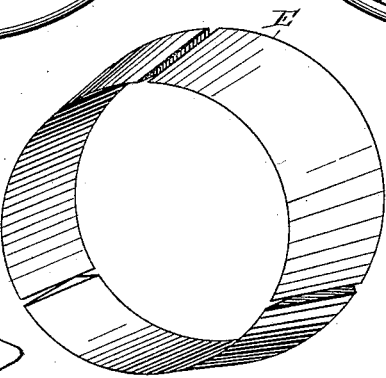
Fig. 4
WITNESSES:
Joshua Bergstrom
Theo. G. Hoster
INVENTOR
M. Sexton
BY Munn & Co
ATTORNEYS.
ANDREW B GRAHAM. PHOTO LITHO. WASHINGTON, D.C.

UNITED STATES PATENT OFFICE.

MICHAEL SEXTON, OF NEW YORK, N. Y., ASSIGNOR OF ONE-HALF TO CATHERINE L. STEUERWALD AND SIMON OTTENBERG, OF SAME PLACE.

PIPE-JOINT.

SPECIFICATION forming part of Letters Patent No. 546,906, dated September 24, 1895.

Application filed March 12, 1895. Serial No. 541,501. (No model.)

*To all whom it may concern:*

Be it known that I, MICHAEL SEXTON, of New York city, in the county and State of New York, have invented a new and Improved Pipe-Joint, of which the following is a full, clear, and exact description.

The object of the invention is to provide a new and improved pipe-joint, which is comparatively simple and durable in construction, easily applied, and more especially designed for uniting pipes without threads cut on the ends thereof, and without solder, calking, or flanges.

The invention consists, principally, of a sleeve, exteriorly-threaded collars screwing in the ends of the sleeve and formed at their inner ends with bevels, and wedge-shaped rings adapted to be engaged by the bevels of the said collars and be pressed upon the pipe periphery at or near the pipe ends.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a sectional side elevation of the improvement. Fig. 2 is a transverse section of the same on the line 2 2 of Fig. 1. Fig. 3 is a similar view of the same on the line 3 3 of Fig. 1, and Fig. 4 is a perspective view of a sectional wedge-shaped ring.

The pipes A and B to be united are without screw-threads on their ends, as plainly illustrated in Fig. 1, and the pipe ends are separated from each other by abutting on opposite sides of an internal annular compound projection formed in the sleeve C, which is provided on its ends with the internal screw-threads $C^2$ and $C^3$. The interior portion of the projection is narrower than the beveled portion, so that annular walls at the junction of said portions form guides or sockets for the ends of pipe-sections. In the threads $C^2$ and $C^3$ screw the exterior threads of the collars D D', respectively, fitting over the pipes A and B, and formed at their inner edges with bevels adapted to engage the exterior bevels of rings E and E', respectively, fitted on the ends of the pipes A and B, each ring E or E' being made in one or more parts, as plainly indicated in Figs. 3 and 4. The base or inner ends of the rings E and E' abut on the washers F and F', respectively, resting on the outer faces of the packing-rings G and G', respectively, seated on the beveled sides of an annular projection $C^4$ carrying the projection C', previously mentioned, and located at or near the middle of the sleeve C.

Now, it will be seen that when the pipes A and B are placed in position in the sleeve C, so as to abut on the annular projection C' thereof, and the collars D D' are screwed up in the threads $C^2$ and $C^3$ of the said sleeve the inner beveled ends of the said collars will press on the rings E and E', respectively, to move the rings inward against the washers F and F', and at the same time compress and consequently fasten the rings upon the peripheral surfaces of the pipes A and B, and thereby forming a friction-joint. As the washers F F' are forced against the packing-rings G G' the several parts form a very tight joint between the annular projections C' and $C^4$, the packing-rings G, and G', and the washers F and F' to prevent any and all escape of fluid through the joints.

It is understood that the outer ends of the collars D and D' are preferably made polygonal in cross-section, so as to enable the operator to conveniently apply a suitable wrench or other tool to turn the said collars and to screw the same in the sleeve C to press on the rings E and E', for the purpose before mentioned.

Now it will be seen that when the rings E and E' are securely fastened on the pipes A and B the collars D and D' of the sleeve C are likewise held securely in position, and the pipes A and B are firmly united with each other, and at the same time a very good fluid-tight joint is provided inside of the coupling.

Having thus fully described my invention, I claim as new and desire to secure by Letters Patent—

1. A pipe joint comprising a sleeve having an integral annular projection against which the ends of the pipe sections abut, collars screwing in the ends of the sleeve and formed at their inner ends with bevels, and wedge-shaped rings each consisting of separated segmental portions adapted to be engaged by the bevels of the said collars and be pressed upon the pipe ends, substantially as shown and described.

2. A pipe joint, comprising a sleeve formed with an integral interior annular projection against which the ends of the pipe sections abut, packing rings seated on the said internal projection and surrounding the said pipes, wedge-shaped rings made in detached segments or sections fitted on the pipes within the said sleeve, and collars screwing in the threaded ends of the said sleeve and formed at their inner ends with bevels adapted to engage the said wedge-shaped rings, to press the latter upon the said packing rings and to fasten the rings on the said pipes, substantially as shown and described.

3. A pipe joint, comprising a sleeve formed with an interior annular projection forming a seat for the ends of the pipes to be coupled, packing rings seated on the said internal projection and surrounding the said pipes, wedge-shaped rings made in separated sections fitted on the pipes within the said sleeve, collars screwing in the threaded ends of the said sleeve and formed at their inner ends with bevels adapted to engage the said wedge-shaped rings, to press the latter upon the said packing rings and to fasten the rings on the said pipes, and washers between the said packing rings and wedge-shaped rings, substantially as shown and described.

4. A pipe joint comprising a shell formed with an interior annular projection having an inclined face and also a recess on each side, the recessed portions forming stops and guides for pipes to be coupled and the inclined portions forming seats, the packing rings in the inclined portions and encircling the said pipes, wedge-shaped rings in segmental sections fitted on the pipes within the said shell and collars screwing in the threaded ends of the said shell and formed at their inner ends with bevels adapted to engage the said wedge-shaped rings and to press the latter forward onto the said packing ring and inward on the sides of the pipes to be coupled, thereby forming a fluid tight joint at the outer annular projection and holding the pipe rigidly in place with the friction joint formed by the wedge-shaped rings being pressed against the sides of pipe, substantially as shown and described.

5. A pipe joint, comprising a shell formed with an interior annular projection having an inclined face and also a recess on each side, the recessed portions forming stops and guides for pipes to be coupled, and the inclined portions forming seats, the packing rings seated on the inclined portions and encircling the said pipes, wedge-shaped rings in detachable segmental sections fitted on the pipes within the said shell, and collars screwing in the threaded ends of the said shell and formed at their inner ends with bevels adapted to engage the said wedge-shaped rings and to press the latter forward onto the said packing ring and inward on the sides of the pipes to be coupled, and metal retaining rings or washers between the said packing rings and wedge-shaped rings, substantially as shown and described.

MICHAEL SEXTON.

Witnesses:
THEO. G. HOSTER,
C. SEDGWICK.